Feb. 28, 1967  W. B. FAHRENBACH  3,306,424
CONVEYOR
Filed March 26, 1964  2 Sheets-Sheet 1
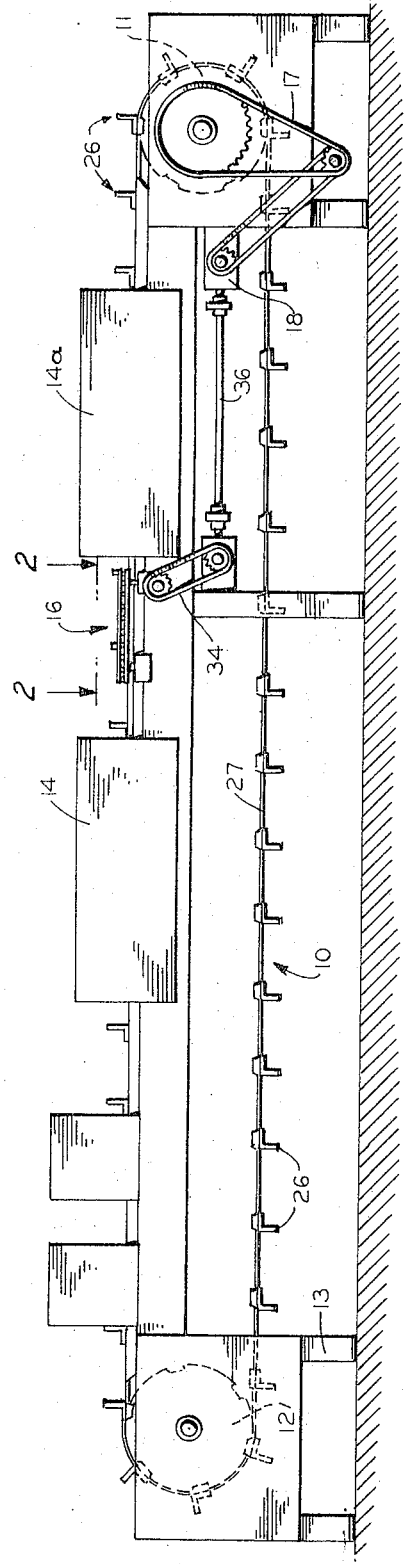
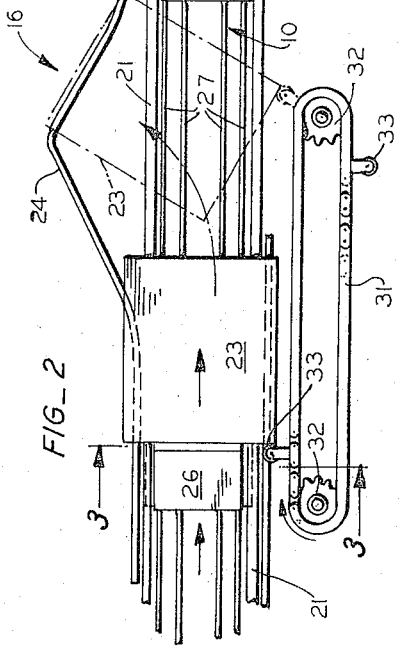
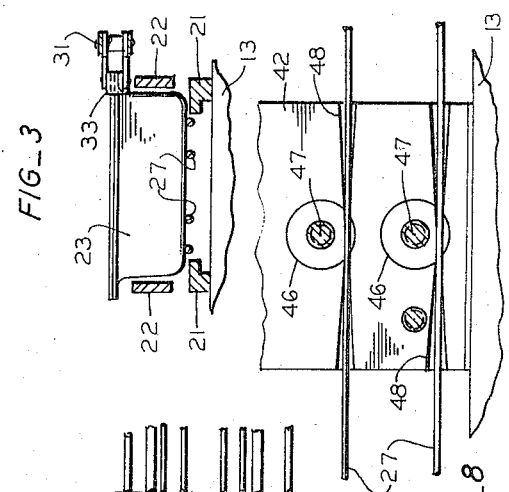
INVENTOR.
WOLFGANG B. FAHRENBACH
BY Allen and Chromy
ATTORNEYS Feb. 28, 1967   W. B. FAHRENBACH   3,306,424
CONVEYOR
Filed March 26, 1964   2 Sheets-Sheet 2
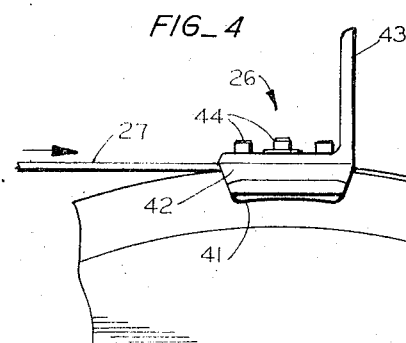
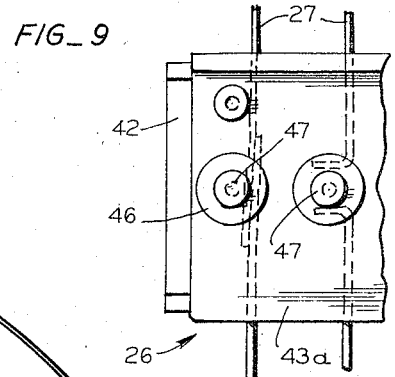
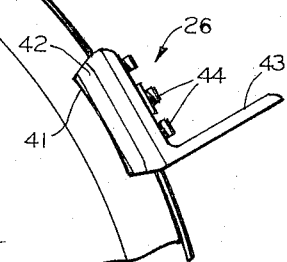
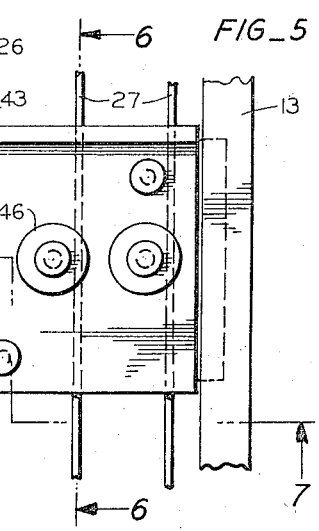
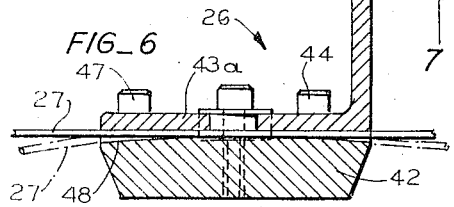
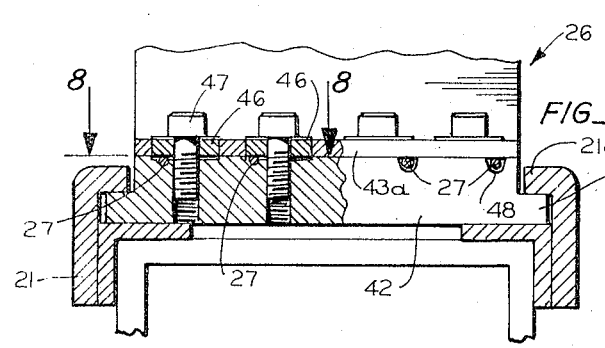
INVENTOR.
WOLFGANG B. FAHRENBACH
BY
ATTORNEYS

United States Patent Office 3,306,424
Patented Feb. 28, 1967

3,306,424
CONVEYOR
Wolfgang B. Fahrenbach, Oakland, Calif., assignor to Robalex, Inc., San Francisco, Calif., a corporation of California
Filed Mar. 26, 1964, Ser. No. 354,864
1 Claim. (Cl. 198—33)

The present invention relates to a conveyor of the type used with food processing apparatus and is concerned more particularly with a conveyor composed of a plurality of parallel wires or filaments which extend about respective sprocket elements which will be easy to clean.

Another object of the invention is to provide a conveyor in which the conveyor element is composed of a plurality of parallel wires carrying connecting elements one portion of which forms the drive means for driving engagement with the sprockets about which the wires are trained.

Other objects and advantages of the invention will be apparent from the following description of a preferred embodiment thereof, taken in conjunction with the attached drawings, in which:

FIG. 1 is a side elevational view of the apparatus employing the conveyor;

FIG. 2 is an enlarged fragmentary plan view of the apparatus taken in a plane indicated by the line 2—2 in FIG. 1;

FIG. 3 is a transverse sectional view through the processing apparatus taken as indicated by the line 3—3 in FIG. 2;

FIG. 4 is a fragmentary elevational view partially in section illustrating the sprocket and conveyor construction in enlarged fashion;

FIG. 5 is a fragmentary plan view of one of the drive lugs and connecting elements of the conveyor;

FIG. 6 is a fragmentary sectional view taken as indicated by the lines 6—6 in FIG. 5;

FIG. 7 is a fragmentary sectional view partially in elevation taken as indicated by the lines 7—7 in FIG. 5;

FIG. 8 is a horizontal sectional view taken as indicated by the lines 8—8 in FIG. 7; and FIG. 9 is a detailed plan view of one of the drive elements of the conveyor illustrating the connection of the ends of the conveyor wires.

Referring to FIG. 1, there is shown a processing apparatus including a conveyor indicated generally at 10 which is trained about a driving sprocket 11 and a driven sprocket 12 which are suitably journaled upon a frame 13. Processing apparatus includes a plurality of processing stations including similar stations 14 and 14a which may be a conventional means of sealing the respective sets of parallel edges of the carton, and between which a 90° turn mechanism 16 is provided for the successive cartons. The drive for the drive sprocket 11 may include suitable chain and sprocket mechanisms 17 connected to a suitable drive mechanism 18 driven by a motor (not shown).

The machine also includes a pair of bottom rails 21 (FIGS. 2 and 3) and a pair of side rails 22 which serve to guide the cartons 23 through the processing apparatus. Intermediate the respective processing stations 14 and 14a, the 90° turn mechanism includes a change in the rail construction 21 from a straight configuration to an outwardly bulged portion or V-shaped rail portion 24, the opposite rail 21 being cut away opposite this particular point. Intermediate the two side rails 21, the conveyor 10 is provided with a series of package conveying elements or angle pieces 26 carried by a series of parallel wires 27 which are referred to in greater detail hereinafter. Associated with as a part of the 90 degree turn mechanism there is provided an auxiliary chain conveyor 31 which is trained about horizontal sprockets 32 and is provided with a pair of roller progressors 33 which are timed with respect to the drive of the chain and the spacing of the cartons 23 apart so that one of the rollers 33 will engage the rear part of the carton opposite to the bulge portion 24, as shown, for example, in FIG. 2, and will advance this edge of the carton faster than the conveyor 21 so that the carton will be turned, as illustrated in dotted lines, through about 45 degrees so as to be subsequently picked up by the conveying lug 33 to complete the 90 degree turn. The chain 31 is suitably driven through a chain and sprocket mechanism 34 and a shaft 36 from the drive mechanism 18.

The conveyor 10 (FIGS. 4–9) is of special construction and, as stated above, comprises a plurality of parallel wires 27, which are trained about the respective drum-type drive and idler sprockets 11 and 12. Referring to FIG. 4, it will be seen that the drive sprockets are each provided with a series of trapezoidal-shaped sockets 41 forming drive seats for engaging the lower element 42 of each of the connecting and carton-propelling elements 26, the upper part comprising angle-shaped propeller lug 43, which is connected to the element 42 by a plurality of fastening elements such as cap screws 44. As shown in FIGS. 5–9, for example, each element 26 has the base of its angle part 43 provided with four transverse aperture to receive clamping sleeve or rings 46, which are held in place by suitable fastening means such as cap screws 47 and engage a wire 27 at the midpoint of the length of the horizontal flange 43a of each angle-shaped lug 43. The wire 27 lies in a longitudinal groove 48 in the lower element and against the flat underface of the angle element 43, the groove 48 being tapered from a narrow part intermediate its ends both vertically and horizontally to its exit portion from the bottom element 42. In this way the wires 27 are clamped only at adjacent their midpoint on the lug bottom portion 42 and are free to either follow a straight contour, as shown in full lines in FIG. 6, at an intermediate portion of the conveyor 10, or to follow a curved path by conforming to the arcuate shape of the lower or bottom of the groove 48. The arcuate shape is on the same radius or diameter as the radius or diameter of the sprocket 11, for example, so that at no time is the wire placed in undue bending stress in traveling around a curve, the curvature of the sprockets 11 and 12 conforming substantially to the normal curvature of the wire when wound in a coil.

To fasten two ends of one of the wires or any wire sections together, the ends may be overlapped, as shown at the left of FIG. 9, for example, beneath a retaining ring 46, or the ends of the wire may be bent at right angles, as shown at the right of FIG. 9, for similar clamping by the ring 46.

Referring to FIG. 7, for example, the bottom part or portion 42 of each drive element is provided with an extending flange 42a at either side to engage under an overhanging lip 21a of the bottom rails 21 to guide each conveyor lug in a straight path without substantial vibration during its travel along the upper stretch of the conveyor chain.

While I have shown and described a preferred embodiment of the invention, it is apparent that the invention is capable of variation and modification from the form shown so that the claim should be limited only by the proper scope of the claim appended thereto.

What I claim is:

In a horizontally disposed conveyor constructed to carry articles in spaced apart timed relation along a substantially horizontal path, a pair of spaced apart sprocket means, means journalling each of said sprocket means for rotation, a pair of guide tracks disposed in parallel relation to and at either side of said path and between said sprocket means, a plurality of endless article supporting parallel wires trained about said sprocket means with one stretch thereof extending in parallel relation between said tracks, a series of conveying elements or lugs attached to said wires at spaced intervals therealong and having inwardly projecting portions with respect to the path of the conveyor, said sprocket means having driving seats engaged by said inwardly projecting portions, and each of said conveying elements having side extensions slidably seating in said tracks to provide a level condition of said conveyor along said upper stretch, each of said conveying elements providing a pusher member for pushing an article along said upper stretch with said article supported by said wires, and at least one processing station located along said upper stretch and having means to operate on each article successively as they are carried therepast.

References Cited by the Examiner

UNITED STATES PATENTS

| | | | |
|---|---|---|---|
| 516,698 | 3/1894 | Bliss | 198—176 |
| 1,945,324 | 1/1934 | Lobbe | 198—190 |
| 2,973,608 | 3/1961 | Killion | 198—33.2 |
| 2,984,332 | 5/1961 | Pierce | 198—33.2 |

FOREIGN PATENTS

| | | |
|---|---|---|
| 202,003 | 5/1956 | Australia. |
| 538,974 | 11/1931 | Germany. |
| 655,271 | 1/1938 | Germany. |
| 276,734 | 8/1930 | Italy. |

EVON C. BLUNK, *Primary Examiner.*

RICHARD E. AEGERTER, SAMUEL F. COLEMAN, *Examiners.*